(12) United States Patent
Ruzon

(10) Patent No.: US 7,606,420 B1
(45) Date of Patent: Oct. 20, 2009

(54) METHOD AND APPARATUS FOR IMPROVING THE SPEED OF BELIEF PROPAGATION

(75) Inventor: Mark A. Ruzon, Mountain View, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 781 days.

(21) Appl. No.: 11/264,537

(22) Filed: Oct. 31, 2005

(51) Int. Cl.
*G06K 9/34* (2006.01)
*G06K 9/62* (2006.01)
*G06F 7/60* (2006.01)

(52) U.S. Cl. .................... 382/180; 382/155; 703/2

(58) Field of Classification Search ............. 382/100, 382/103, 106, 107, 140, 154, 155, 168, 174, 382/181, 184, 193, 194, 199–203, 232, 255, 382/260, 264, 274, 276, 286–288, 291, 305, 382/317–321; 348/584; 375/240.16; 345/475, 345/530, 166

See application file for complete search history.

(56) References Cited

U.S. PATENT DOCUMENTS

| | | | | |
|---|---|---|---|---|
| 5,123,057 | A * | 6/1992 | Verly et al. | 382/156 |
| 5,963,653 | A | 10/1999 | McNary et al. | |
| 6,535,227 | B1 * | 3/2003 | Fox et al. | 715/736 |
| 6,745,157 | B1 * | 6/2004 | Weiss et al. | 703/2 |
| 6,795,590 | B1 * | 9/2004 | Chen | 382/294 |
| 6,910,000 | B1 * | 6/2005 | Yedidia et al. | 703/2 |
| 6,944,342 | B1 * | 9/2005 | Stahl et al. | 382/224 |
| 6,987,890 | B2 * | 1/2006 | Joshi et al. | 382/240 |
| 7,062,085 | B2 * | 6/2006 | Luo et al. | 382/165 |
| 7,454,038 | B1 * | 11/2008 | Ruzon | 382/107 |
| 2006/0228002 | A1 * | 10/2006 | Zitnick et al. | 382/107 |
| 2006/0285762 | A1 * | 12/2006 | Sun et al. | 382/254 |

OTHER PUBLICATIONS

J. Yedidia, W. T. Freeman, and Y. Weiss. Understanding belief propagation and its generalizations. <http://www.merl.com/papers/docs/TR2001-22.pdf>, 2002.*

(Continued)

*Primary Examiner*—Daniel G Mariam
*Assistant Examiner*—Andrae S Allison
(74) *Attorney, Agent, or Firm*—Robert C. Kowert; Meyertons, Hood, Kivlin, Kowert & Goetzel, P.C.

(57) ABSTRACT

One embodiment of the present invention provides a system that efficiently performs a belief-propagation (BP) operation. During this process, for each node i in a BP graph, the system iteratively performs the following operations. First, the system receives incoming messages $m_{ji}$ at node i for all adjacent nodes j. Next, the system calculates the full product $P_i$ of all incoming messages $m_{ji}$. The system then produces an outgoing message $m_{ij}$ from node i to node j by, computing a partial product $P_{ij}$ of all incoming messages to node i except for the message from node j by dividing the $P_i$ by the incoming message from node j. The system then combines $P_{ij}$ with a data function for node i and a smoothness function between node i and node j to produce outgoing message $m_{ij}$. Finally the system communicates outgoing message $m_{ij}$ to node j. This system improves computational efficiency over existing BP techniques because computing the full product $P_i$ first and then dividing by individual incoming messages to produce each partial product is faster than computing each partial product separately.

20 Claims, 3 Drawing Sheets

OTHER PUBLICATIONS

"Interpreting images by propagating Bayesian beliefs", Yair Weiss, Dept. of Brain and cognitive Sciences, MIT.

"Efficient Belief Propagation for Early Vision", Pedro F. Felzenszwalb and Daniel P. Huttenlocher, Department of Computer Science, Cornell University.

"Correctness of belief propagation in Gaussian graphical models of arbitrary topology", Yair Weiss and William T. Freeman. UC Berkeley, Report No. USB/CSD-99-1046, Jun. 1999.

"Understanding Belief Propagation and its Generalizations", Jonathan S. Yedidia, William T. Freeman and Yair Weiss TR-2001-22, Mitsubishi Electric Research Laboratories.

Publication: "Understanding Belief Propagation and Its Generalizations" by Yedidia et al., Delivered in the "Distinguished Lecture" track, 2001 International Joint Conference on Artificial Intelligence, Aug. 2001. To be published in a book collecting those lectures. First Draft Aug. 2001, final draft Jan. 2002, copyright Mitsubishi Electric Research Laboratories, Inc. 2002.

Publication: "*Belief Updating by Network Propagation*" by Judea Pearl, Chapter 4 from Probalistic Reasoning in Intelligent Systems: Networks of Plausible Inference, revised second printing, pp. 143-174. ISBN-13: 978-1-55860-479-7.

Publication: *Efficient Belief Propagation for Early Vision*, by Felzenszwalb and Huttenlocher, Department of Computer Science Cornell University, CVPR, vol. I, pp. 261-268, 2004 IEEE.

Publication: "*Interpreting Images by Propagating Bayesian Beliefs*" by Yair Weiss, in M.C. Mozer et al., editors, Advances in Neural Information Processing Systems 9, pp. 908-915, Bradford Books, 1997.

Publication: "*Correctness of Belief Propagation in Gaussian Graphical Models of Arbitrary Topology*" by Weiss and Freeman, Technical Report UCB/CSD-99-1046, UC Berkeley, Jun. 1999.

\* cited by examiner

METHOD AND APPARATUS FOR IMPROVING THE SPEED OF BELIEF PROPAGATION

BACKGROUND

1. Field of the Invention

The present invention relates to techniques for efficiently performing "belief-propagation" operations, which solve graphical inference problems through a series of local message-passing operations.

2. Related Art

Belief Propagation (BP) has recently established itself as an effective technique for solving some of the ill-posed labeling problems that are typical in computer vision. In these problems, each pixel becomes a node in a graph, and local information propagates by passing messages representing probability distributions along the edges to its neighbors. Messages are passed iteratively until convergence is reached.

Early applications of BP were to one-dimensional problems such as "contour matching." (See Y. Weiss. Interpreting images by propagating Bayesian beliefs. In M. C. Mozer et al., editors, *Advances in Neural Information Processing Systems* 9, pages 908-915. Bradford Books, 1997.) These applications adhered to arguments that BP may not converge on graphs with loops (see J. Pearl. *Probabilistic Reasoning in Intelligent Systems*. Morgan Kaufmann, 1988).

Later, BP was discovered to converge on a number of interesting problems involving loopy graphs and has since solved problems in tracking, image restoration, finding objects in clutter, and estimating occluded features, among others. Weiss and Freeman have provided a theoretical justification for the convergence of BP on such loopy graphs (see Y. Weiss and W. T. Freeman. Correctness of BP in Gaussian graphical models of arbitrary topology. Technical Report UCB/CSD-99-1046, UC-Berkeley, June 1999).

These promising results have spurred interest in speeding up BP. Felzenswalb and Huttenlocher discovered a number of useful optimizations to the BP algorithm itself, making it practical for a wider range of problems (see P. F. Felzenszwalb and D. P. Huttenlocher. Efficient belief propagation for early vision. In *CVPR*, volume I, pages 261-268, 2004).

Existing BP techniques perform a large number of computationally-expensive operations, such as multiplications. Iteratively performing these computationally-expensive operations during the BP process can consume a large amount of computational time. Hence, what is needed is a method and an apparatus for minimizing the number of computationally-expensive operations performed during the BP process.

SUMMARY

One embodiment of the present invention provides a system that efficiently performs a belief-propagation (BP) operation. During this process, for each node i in a BP graph, the system iteratively performs the following operations. First, the system receives from each adjacent node j an incoming message $m_{ji}$ at node i. Next, the system calculates the full product $P_i$ of all incoming messages $m_{ji}$. The system then produces an outgoing message $m_{ij}$ from node i to each adjacent node j by calculating a partial product $P_{ij}$ of all incoming messages to node i except for the message from node j by dividing $P_i$ by the incoming message $m_{ji}$ from node j. The system then combines $P_{ij}$ with a data function for node i and a smoothness function between node i and node j to produce outgoing message $m_{ij}$. Finally, the system communicates outgoing message $m_{ij}$ to node j. This system improves computational efficiency over existing BP techniques because computing the full product $P_i$ first and then dividing by individual incoming messages to produce each partial product is faster than computing each partial product separately.

In a variation on this embodiment, computing the full product $P_i$ involves first multiplying all incoming messages to node i except for the message $m_{ki}$ from node k to compute the partial product $P_{ik}$, and then multiplying $P_{ik}$ by the message $m_{ki}$ to produce the full product $P_i$. In this way, the partial product $P_{ik}$ can be computed while the full product $P_i$ is being computed.

In a variation on this embodiment, after each iteration of the BP process over all nodes of the BP graph, the system computes differences between old and new messages over the entire BP graph to compute an amount of change for the entire BP graph. If this amount of change falls below a threshold, the system terminates the BP process.

In a variation on this embodiment, after each iteration of the BP process, the system determines whether a node has converged by computing differences between old and new incoming messages received by the node. If the node has converged, the system subsequently resends previously sent outgoing messages from the node instead of recomputing the outgoing messages.

In a further variation, if a node has converged, the system sets a flag to indicate that the node has converged.

In a variation on this embodiment, the BP process is used to compute an optical flow for an image. In this embodiment, each node in the BP graph holds a local velocity estimate for a corresponding point in the image, and each node is adjacent to nodes that are associated with neighboring points in the image. Furthermore, the system uses the computed optical flow to compute an apparent motion for one or more objects in the image.

Table 1 illustrates operations used during the BP process in accordance with an embodiment of the present invention.

Table 2 contains code for computing outgoing messages from nodes in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs).

Overview of Belief Propagation

Figure 1:
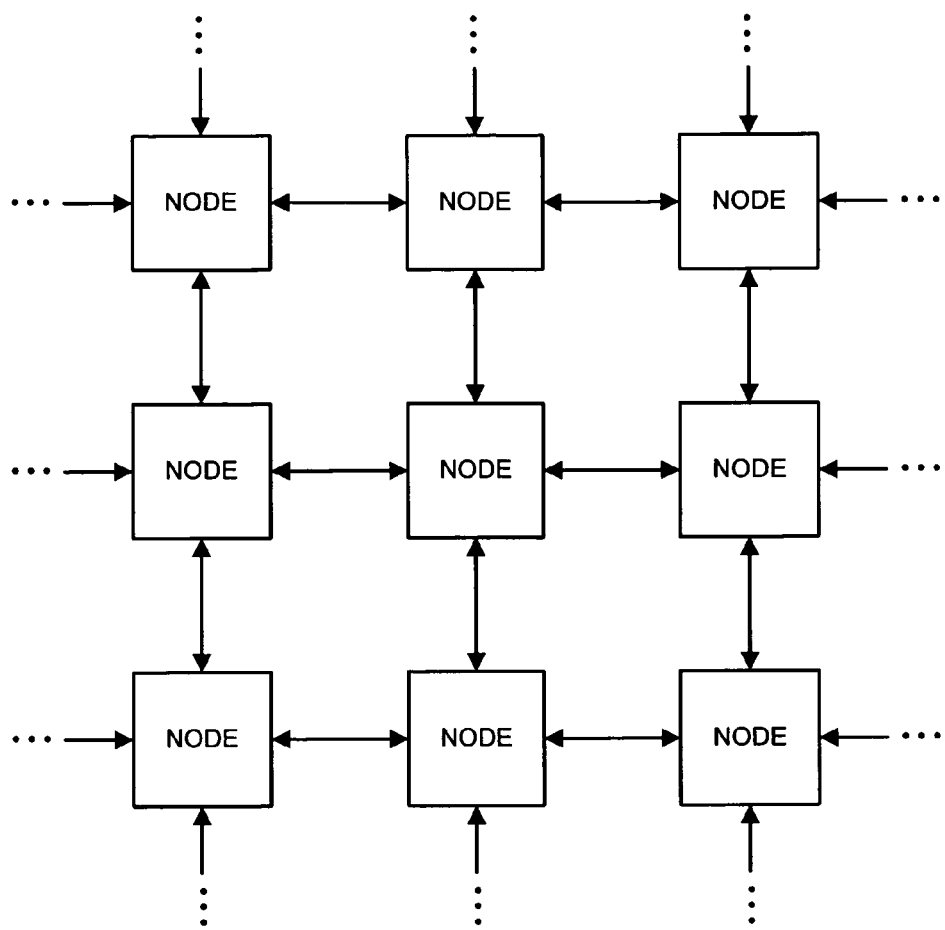
FIG. 1 illustrates an exemplary graph for the BP process in accordance with an embodiment of the present invention.

The BP technique first constructs a BP graph where each node represents a site, for example a pixel in an image, where the belief is deemed to be atomic. FIG. 1 illustrates an exemplary graph for the BP process in accordance with an embodiment of the present invention. In this exemplary graph each node is associated with a corresponding pixel in an image. Furthermore, each node communicates with four adjacent nodes through the illustrated edges. Note the graph illustrated in FIG. 1 is merely an exemplary graph. In general, many different types of graphs can be used during the BP process.

Messages are passed along the edges of the BP graph, which connect nodes that are closely related. The message that node i sends node j can be updated by the following rule as described in the BP literature:

$$m_{ij}(x_j) \leftarrow \sum_{x_i} \phi_i(x_i) \psi_{ij}(x_i, x_j) \prod_{k \in N(i) \setminus j} m_{ki}(x_i), \quad (1)$$

which we rewrite and simplify as:

$$m_{ij}(y) \leftarrow \sum_{x} \phi_i(x) \psi_{ij}(x, y) \prod_{k \in N(i) \setminus j} m_{ki}(x), \quad (2)$$

where $\phi_i(x)$ is the data (evidence) function, $\psi_{ij}(x, y)$ is the smoothness (interaction) function, the product is over all messages coming into node i except for node j, and the summation is over the set of allowable states (labels) that node can assume. This simplification emphasizes that nodes i and j may have different sets of labels (though this is rare in practice) and clears up various confusion in interpreting the subscripts. The messages are treated as probability distributions which need not be normalized but usually are for numerical reasons. Once the messages have converged, the belief is always a probability distribution:

$$b_i(x) = k\phi_i(x) \prod_{j \in N(i)} m_{ji}(x), \quad (3)$$

where k is a normalizing constant. The label assigned to each node at the end is a function of the belief, such as the maximum a posteriori (MAP) estimate or the minimum mean-squared error (MMSE) estimate.

The main operation involved is multiplication, which is usually more expensive than addition. Therefore, some researchers have chosen to represent probabilities using their negative logarithms, leading to the following equations:

$$m_{ij}(y) \leftarrow \min_{x} \left( D_i(x) + V_{ij}(x, y) + \sum_{k \in N(i) \setminus j} m_{ki}(x) \right), \quad (4)$$

$$b_i(x) = D_i(x) + \sum_{j \in N(i)} m_{ji}(x), \quad (5)$$

where $D_i(x) = -\log \phi_i(x)$ and $V_{ij}(x, y) = -\log \psi_{ij}(x, y)$.

Because comparing these two formulations is an important part of this work, it is useful both for purposes of understanding and for generality to abstract the meaning of the operations away from their implementation. Table 1 below gives the names we will use to describe the operations, along with their equivalent meanings in "P-space" (probability space) and "NL-space" (negative log space). The C++ operators shown in the last column correspond to the P-space meanings.

Some differences between P-space and NL-space are immediately apparent. The most interesting is the aggregation function, since in general $-\log(x+y) \neq \min(-\log x, -\log y)$. The equation approximately holds when x and y are orders of magnitude apart, which is in some sense the goal of BP.

TABLE 1

| Operation | P-space | NL-space | C++ |
| --- | --- | --- | --- |
| composition | multiplication | addition | *,*= |
| uncomposition | division | subtraction | / |
| aggregation | addition | minimum | +,+= |
| normalization | divide by constant | subtract constant | |
| power | exponentiation | multiplication | |
| difference | subtraction | subtraction | − |
| initialization | set to nonzero constant | set to constant | |

The other discrepancies between P-space and NL-space do not affect the computation. The normalization constant in P-space is usually the sum of the probabilities. While this is not the same as setting the sum of the negative logs of the probabilities to zero, the point of normalization is to prevent underflow or overflow, and so the requirements are weaker. Similarly, initializing the probability corresponding to a given label to 1/n in P-space or log n in NL-space given n labels is unnecessary. Also, note that the inverse of composition, "uncomposition," assumes that probabilities are non-zero, which is not problematic since BP usually makes this assumption implicitly.

Efficient Belief Propagation

The naive implementation of equations (1) or (4) within a set of "for loops" will result in much duplicated computation. In this section, we discuss an efficient technique for computing the messages and an optimization to forgo computing them at all. Note that this discussion can be applied to any domain, as opposed to (P. F. Felzenszwalb and D. P. Huttenlocher. Efficient belief propagation for early vision. In *CVPR*, volume I, pages 261-268, 2004.) where the optimizations can be applied only under certain conditions.

Efficient Message Computation

Table 2 contains working C++ code for computing all outgoing messages from one node using the minimum number of composition and uncomposition operations—n1+2n−1 instead of a maximum of nl+$n^2$−n using a simpler approach. Here n is the degree of the node, and l is the number of labels at the destination node (assumed to be constant for all nodes in this discussion).

This technique is based on two realizations. The first is that equation (1) can be simplified by first composing all elements having nothing to do with y:

$$m_{ij}(y) \leftarrow \sum_x P_{ij}(x)\psi_{ij}(x, y). \qquad (6)$$

This simplification is important because each element of $P_{ij}(x)$ is multiplied by many values in $\psi_{ij}(x, y)$, and so many computations can be saved by computing $P_{ij}(x)$ first.

The second realization is that there is much redundancy in $P_{ij}(x)$ for different values of j. Computing the product of the incoming messages involves the "leave-one-out" approach, since the outgoing message $m_{ij}$ does not depend on the incoming message $m_{ji}$. We first compute the "full product" of all incoming messages, during which we get one message's product for free. We then uncompose each message out of the full product to get the remaining messages' products, after which we apply the smoothness function by composing each element of $P_{ij}(x)$ with the appropriate row of $\psi_{ij}(x, y)$ and aggregating.

TABLE 2

```
// Assumes L and V are the same for all nodes
// Assumes all messages have length L
// Assumes M_in and M_out are arrays of length N
// Assumes V is an array of length L
template <typename MT, // MT models a Message Type
          typename Integer>
void compute_node_messages (Integer N, Integer L,
    const MT& D, const MT *V, const MT *M_in, MT *M_out)
{
    MT temp = D, P[N];
    Integer i, j;
    for (i = 0; i < N - 1; ++i)
        temp *= M_in [i] ;
    P[N-1] = temp;
    temp *= M_in [N-l];
    for(i = 0; i < N - 1; ++i) {
        P[i] = temp / M_in [i];
    for (i = 0; i < N; ++i)
        // P [i][j] is the probability of state j in
        // the ith element of P.
        M_out [i] = P[i][0] * V[0];
        for (j = 1; j < L; ++j)
            M_out[i] += P[i][j] * V[j]
    }
}
```

Note that the technique illustrated in Table 2 can be extended to the case where different nodes have different label sets or where V is different between different pairs of nodes in the graph.

Converged Nodes

BP's termination condition requires that the messages have converged, meaning that successive iterations change the messages by an insignificant amount. One simple optimization that can greatly cut down on the running time is to measure whether a single node has converged, meaning that all messages coming into the node have converged. If this has happened, we can set a "converged" flag and resend previously sent outgoing messages instead of recomputing the same outgoing messages. Note that, since it is possible for one part of the graph to converge before other parts, the flag may need to be cleared if one of the incoming messages changes significantly.

This optimization adds a check to every node at every iteration, but empirical evidence shows that the number of converged nodes generally grows very quickly, saving a lot of computation. Convergence checks need not be performed at every iteration. A more complicated procedure would be to examine only those converged nodes that border unconverged nodes.

Belief Propagation Process

Figure 2:
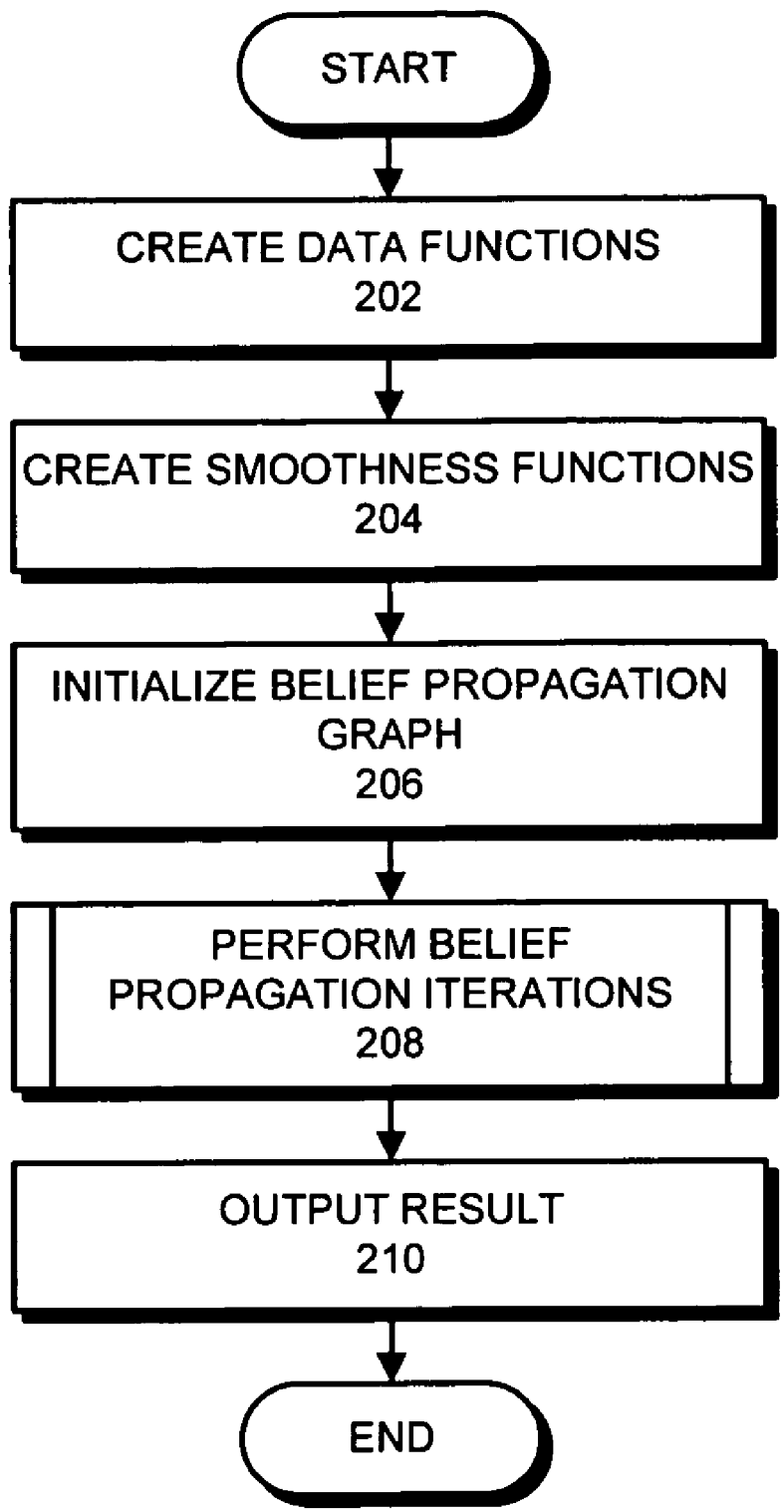
FIG. 2 presents a flow chart of an iterative BP process in accordance with an embodiment of the present invention.

FIG. 2 presents a flow chart of an iterative BP process in accordance with an embodiment of the present invention. This iterative BP process generally operates as follows. Before the BP process starts, the system performs a number of initialization operations. These initialization operations include: creating data functions for nodes (step 202) and creating smoothness functions between nodes (step 204). They also include initializing a BP graph (step 206), which involves constructing a graph as is illustrated in FIG. 1.

The system then performs BP iterations, during which messages are passed between nodes in the BP graph (step 208). Next, after the BP iterations have converged, the system outputs a result (step 210).

Belief-Propagation Iterations

Figure 3:
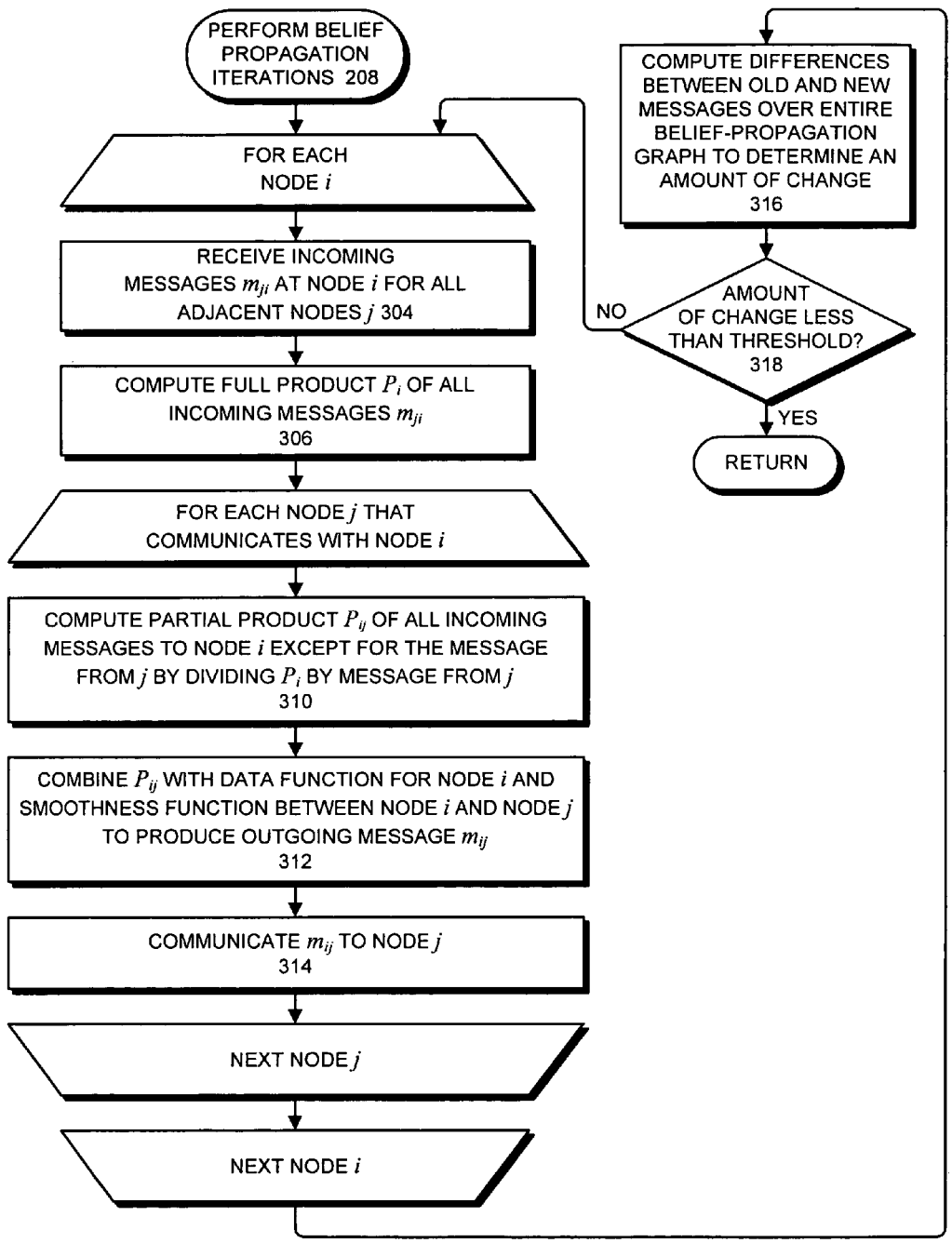
FIG. 3 presents a flow chart illustrating the operations involved in performing BP iterations in accordance with an embodiment of the present invention.

FIG. 3 presents a flow chart illustrating the operations involved in performing BP iterations in accordance with an embodiment of the present invention. This flow chart illustrates in more detail the operations which take place during step 208 of the flow chart in FIG. 2. For each node i in a BP graph, the system iteratively performs the following operations. First, the system receives incoming messages $m_{ji}$ at node i (step 304).

Next, the system computes the full product $P_i$ of all incoming messages $m_{ji}$ (step 306). In doing so, the system can first multiply all incoming messages to node i except for the message from node k to compute the partial product $P_{ik}$, and can then multiply $P_{ik}$ by the message from node k to produce the full product $P_i$. In this way, the partial product $P_{ik}$ can be computed while the full product $P_i$ is being computed.

The system then computes an outgoing message my from node i to each adjacent node j. In doing so, the system first computes a partial product $P_{ij}$ of all incoming messages to node i except for the message from node j by dividing $P_i$ by the incoming message from node j (step 310). The system then composes $P_{ij}$ with a data function for node i and a smoothness function between node i and node j to produce outgoing message $m_{ij}$ (step 312).

Next, the system communicates outgoing message my to node j (step 314).

After each iteration of the BP process over all nodes of the BP graph, the system computes differences between old and new messages over the entire BP graph to compute an amount of change for the entire BP graph (step 316). If this amount of change falls below a threshold, the system terminates the BP process. Otherwise, the system continues to perform BP iterations.

Note that this system achieves computational efficiency because computing the full product $P_i$ first and then dividing by individual incoming messages to produce each partial product is faster than computing each partial product separately.

As mentioned above, additional efficiencies can be achieved by comparing the incoming messages into a given node with previously received incoming messages to determine whether the given node has converged. If so, the system can set a "converged" flag to indicate that the node has converged, and can subsequently resend previously sent outgoing messages from the given node instead of recomputing the outgoing messages. Note that since it is possible for one part of the graph to converge before other parts, the converged flag may need to be cleared if one of the incoming messages changes significantly.

Also note that whenever the specification and appended claims refers to "computing a product," this computation can involve performing a multiplication operation, or alternatively adding logarithms (or negative logarithms), to compute the product.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for efficiently performing a belief-propagation operation, the method comprising:
   using a computer to perform the following:
      for each node i in a belief-propagation graph, iteratively:
         receiving incoming messages $m_{ji}$ at node i for all adjacent nodes j;
         calculating the full product $P_i$ of all incoming messages $m_{ji}$; and
         producing an outgoing message $m_{ij}$ from node i to a node j by,
            calculating a partial product $P_{ij}$ of all incoming messages to node i except for the message from node j by dividing $P_i$ by the incoming message from node j, and
            composing $P_{ij}$ with a data function for node i and a smoothness function between node i and node j to produce outgoing message $m_{ij}$; and
         communicating outgoing message $m_{ij}$ to node j.

2. The method of claim 1, wherein computing the full product $P_i$ involves:
   multiplying all incoming messages to node i except for the message from node k to compute the partial product $P_{ik}$; and
   multiplying $P_{ik}$ by the message from node k to produce the full product $P_i$;
   whereby the partial product $P_{ik}$ can be computed while the full product $P_i$ is being computed.

3. The method of claim 1, wherein after each iteration of the belief-propagation process over all nodes of the belief-propagation graph, the method further comprises:
   computing differences between old and new messages over the entire belief-propagation graph to compute an amount of change for the entire belief-propagation graph; and
   if the amount of change falls below a threshold, terminating the belief-propagation process.

4. The method of claim 1, wherein after each iteration of the belief-propagation process, the method further comprises:
   determining whether a node has converged by computing differences between old and new messages for the node; and
   if the node has converged, subsequently resending previously sent outgoing messages from the node instead of recomputing the outgoing messages.

5. The method of claim 4, wherein if a node has converged, the method further comprises setting a flag to indicate that the node has converged.

6. The method of claim 1, wherein the belief-propagation process is used to compute an optical flow for an image, wherein each node in the belief-propagation graph holds a local velocity estimate for a corresponding point in the image, and wherein each node is adjacent to nodes that are associated with neighboring points in the image; and
   wherein the method further comprises using the computed optical flow to compute an apparent motion for one or more objects in the image.

7. A computer-readable storage medium storing instructions that when executed by a computer cause the computer to perform a method for efficiently performing a belief-propagation operation, wherein for each node i in a belief-propagation graph, the method comprises iteratively:
   receiving incoming messages $m_{ji}$ at node i for all adjacent nodes j;
   calculating the full product $P_i$ of all incoming messages $m_{ji}$; and
   producing an outgoing message $m_{ji}$ from node i to a node j by,
      calculating a partial product $P_{ij}$ of all incoming messages to node i except for the message from node j by dividing the $P_i$ by the incoming message $m_{ji}$ from node j, and
      composing $P_{ij}$ with a data function for node i and a smoothness function between node i and node j to produce outgoing message $m_{ij}$; and
   communicating outgoing message $m_{ij}$ to node j.

8. The computer-readable storage medium of claim 7, wherein computing the full product $P_i$ involves:
   multiplying all incoming messages to node i except for the message from node k to compute the partial product $P_{ik}$; and
   multiplying $P_{ik}$ by the message from node k to produce the full product $P_i$;
   whereby the partial product $P_{ik}$ can be computed while the full product $P_i$ is being computed.

9. The computer-readable storage medium of claim 7, wherein after each iteration of the belief-propagation process over all nodes of the belief-propagation graph, the method further comprises:
   computing differences between old and new messages over the entire belief-propagation graph to compute an amount of change for the entire belief-propagation graph; and
   if the amount of change falls below a threshold, terminating the belief-propagation process.

10. The computer-readable storage medium of claim 7, wherein after each iteration of the belief-propagation process, the method further comprises:
   determining whether a node has converged by computing differences between old and new messages for the node; and
   if the node has converged, subsequently resending previously sent outgoing messages from the node instead of recomputing the outgoing messages.

11. The computer-readable storage medium of claim 10, wherein if a node has converged, the method further comprises setting a flag to indicate that the node has converged.

12. The computer-readable storage medium of claim 7, wherein the belief-propagation process is used to compute an optical flow for an image, wherein each node in the belief-propagation graph holds a local velocity estimate for a corresponding point in the image, and wherein each node is adjacent to nodes that are associated with neighboring points in the image; and
   wherein the method further comprises using the computed optical flow to compute an apparent motion for one or more objects in the image.

13. An apparatus that efficiently performs a belief-propagation operation, comprising:

a computation mechanism within a computer system, wherein for each node i in a belief-propagation graph, the computation mechanism is configured to iteratively, receive incoming messages $m_{ji}$ at node i for all adjacent nodes i, calculate the full product $P_i$ of all incoming messages $m_{ji}$, produce an outgoing message $m_{ij}$ from node i to a node j, and in doing so to, calculate a partial product $P_{ij}$ of all incoming messages to node i except for the message from node j by dividing the $P_i$ by the incoming message from node j, and to compose $P_{ij}$ with a data function for node i and a smoothness function between node i and node j to produce outgoing message $m_{ij}$; and a communication mechanism within the computer system configured to communicate outgoing message $m_{ij}$ to node j.

14. The apparatus of claim 13, wherein while computing the full product $P_i$, the computation mechanism is configured to:

multiply all incoming messages to node i except for the message from node k to compute the partial product $P_{ik}$; and to multiply $P_{ik}$ by the message from node k to produce the full product $P_i$;

whereby the partial product $P_{ik}$ can be computed while the full product $P_i$ is being computed.

15. The apparatus of claim 13, wherein after each iteration of the belief-propagation process over all nodes of the belief-propagation graph, the computation mechanism is configured to:

compute differences between old and new messages over the entire belief-propagation graph to compute an amount of change for the entire belief-propagation graph; and if the amount of change falls below a threshold, to terminate the belief-propagation process.

16. The apparatus of claim 13, further comprising a resending mechanism, wherein after each iteration of the belief-propagation process, the resending mechanism is configured to:

determine whether a node has converged by computing differences between old and new messages for the node; and if the node has converged, to subsequently resend previously sent outgoing messages from the node instead of recomputing the outgoing messages.

17. The apparatus of claim 16, wherein if a node has converged, the computation mechanism is configured to set a flag to indicate that the node has converged.

18. The apparatus of claim 13, wherein the computation mechanism is used to compute an optical flow for an image, wherein each node in the belief-propagation graph holds a local velocity estimate for a corresponding point in the image, and wherein each node is adjacent to nodes that are associated with neighboring points in the image; and wherein the computation mechanism is further configured to use the computed optical flow to compute an apparent motion for one or more objects in the image.

19. A computer-implemented method for efficiently performing a belief-propagation operation, the method comprising:

using a computer to perform the following:

for each node i in a belief-propagation graph, iteratively:

receiving incoming messages $m_{ji}$ at node i for all adjacent nodes j;

producing an outgoing message $m_{ij}$ from node i to node j by, calculating a partial product $P_{ij}$ of all incoming messages to node i except for the message from node j, and composing $P_{ij}$ with a data function for node i and a smoothness function between node i and node j to produce outgoing message $m_{ij}$;

communicating outgoing message $m_{ij}$ to node j;

after each iteration of the belief-propagation process, determining whether a given node has converged by computing differences between old and new messages for the given node; and if the given node has converged, subsequently resending previously sent outgoing messages from the given node instead of recomputing the outgoing messages.

20. The method of claim 19, wherein after each iteration of the belief-propagation process over all nodes of the belief-propagation graph, the computation mechanism is configured to:

compute differences between old and new messages over the entire belief-propagation graph to compute an amount of change for the entire belief-propagation graph; and if the amount of change falls below a threshold, to terminate the belief-propagation process.

* * * * *

UNITED STATES PATENT AND TRADEMARK OFFICE
CERTIFICATE OF CORRECTION

PATENT NO.        : 7,606,420 B1
APPLICATION NO.   : 11/264537
DATED             : October 20, 2009
INVENTOR(S)       : Mark A. Ruzon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this

Twelfth Day of October, 2010

David J. Kappos
*Director of the United States Patent and Trademark Office*